US011546918B2

(12) United States Patent
Guo

(10) Patent No.: US 11,546,918 B2
(45) Date of Patent: Jan. 3, 2023

(54) COMMUNICATION SYSTEM WITH ALLOCATING FREQUENCIES TO INTERFERED USER EQUIPMENTS

(71) Applicant: NEC Corporation, Tokyo (JP)

(72) Inventor: Tao Guo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 83 days.

(21) Appl. No.: 17/258,029

(22) PCT Filed: Jul. 9, 2019

(86) PCT No.: PCT/JP2019/027096
§ 371 (c)(1),
(2) Date: Jan. 5, 2021

(87) PCT Pub. No.: WO2020/013164
PCT Pub. Date: Jan. 16, 2020

(65) Prior Publication Data
US 2021/0176766 A1 Jun. 10, 2021

(30) Foreign Application Priority Data

Jul. 13, 2018 (GB) ...................................... 1811565

(51) Int. Cl.
*H04W 72/08* (2009.01)
*H04W 4/08* (2009.01)
(Continued)

(52) U.S. Cl.
CPC ......... *H04W 72/082* (2013.01); *H04L 5/0073* (2013.01); *H04W 4/08* (2013.01); *H04W 72/0453* (2013.01); *H04W 72/085* (2013.01)

(58) Field of Classification Search
CPC . H04W 72/082; H04W 4/08; H04W 72/0453; H04W 72/085; H04L 5/0073
See application file for complete search history.

(56) References Cited

U.S. PATENT DOCUMENTS 11,153,890 B2 * 10/2021 Caretti ................. H04W 8/005
2005/0282550 A1 12/2005 Cho et al.
(Continued)

FOREIGN PATENT DOCUMENTS

| EP | 2858398 A1 | 4/2015 |
| EP | 3125632 A1 | 2/2017 |
| WO | 2013/178037 A1 | 12/2013 |

OTHER PUBLICATIONS

D. Parruca, and J. Gross, "Throughput analysis of proportional fair scheduling for sparse and ultra-dense interference-limited OFDMA/LTE networks", IEEE Transactions on Wireless Communications, vol. 15, No. 10, pp. 6857-6870, Oct. 2016.
(Continued)

*Primary Examiner* — Christopher M Crutchfield
*Assistant Examiner* — Tito Q Pham

(57) ABSTRACT

A small cell communication system is disclosed in which an apparatus (e.g. a central controller) controls allocation of frequency resources in the cells. The apparatus obtains respective information (e.g. RSRP) representing a quality of communication at each user equipment (UE) in the cells; determines, based on the received information, whether a corresponding UE is a subject of interference and, when the corresponding UE is a subject of interference, identifies at least one aggressor causing the interference to that UE. In each cell, the UEs served by that cell are grouped such that UEs having a common aggressor (or common aggressors) are grouped into respective group(s), and any UEs not subject to interference are grouped into another group. The apparatus allocates at least one frequency for each UE based on the respective group into which that UE has been grouped.

14 Claims, 7 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2007/0058583 | A1* | 3/2007 | Cho | H04W 72/06 370/329 |
| 2014/0078976 | A1* | 3/2014 | Novak | H04W 72/082 370/329 |
| 2016/0308590 | A1* | 10/2016 | Wang | H04W 72/082 |
| 2016/0373971 | A1* | 12/2016 | Kulal | H04W 36/0016 |
| 2017/0064721 | A1* | 3/2017 | Noh | H04L 25/0224 |
| 2017/0202006 | A1* | 7/2017 | Rao | H04W 72/1231 |
| 2018/0167182 | A1* | 6/2018 | Cao | H04L 5/0091 |

OTHER PUBLICATIONS

International Search Report for PCT Application No. PCT/JP2019/027096, dated Sep. 19, 2019.
Written opinion for PCT Application No. PCT/JP2019/027096, dated Sep. 19, 2019.
Search Report for GB1811565.9 dated Jan. 23, 2019.
3GPP TS 36.300 V15.2.0 Release 15, LTE; Evolved Universal Terrestrial Radio Access (E-UTRA) and Evolved Universal Terrestrial Radio Access Network (E-UTRAN); Overall description; Stage 2, pp. 1-374, Jul. 2018.
S. E. Elayoubi, O. Ben Haddada, and B. Fourestie, "Performance evaluation of frequency planning schemes in OFDMA-based networks," IEEE Transactions on Wireless Communications., vol. 7, No. 5, pp. 1623-1633, May 2008.
Huawei, R1-050507, "Soft frequency reuse scheme for UTRAN LTE", 3GPP TSG RAN WG1 Meeting #41, Athens, Greece, May 9-13, 2005.
R. Y. Chang, Z. Tao, J. Zhang, and C.-C. Kuo, "A graph approach to dynamic fractional frequency reuse (FFR) in multi-cell OFDMA networks". IEEE Intl. Confl on Commum. (ICC), Dresden, Germany, Jun. 2009.
M. Qian, W. Hardjawana, Y. Li, B. Vucetic, X. Yang, and J. Shi, "Adaptive soft frequency reuse scheme for wireless cellular networks", IEEE Transactions on Vehicular Technology vol. 64, No. 1, pp. 118-131, Jan. 1, 2015.
M. Y. Arslan, J. Yoon, K. Sundaresan, S. V. Krishnamurthy, and S. Banerjee, "FERMI: a femtocell resource management system for interference mitigation in OFDMA networks", ACM Intl. Conf. on Mobile Comput. and Netw. (Mobicom), Las Vegas, USA, Sep. 2011.
H. C. Lee, D. C. Oh, and Y. H. Lee, "Mitigation of inter-femtocell interference with adaptive fractional frequency reuse", IEEE Intl. Conf. on Commum. (ICC), Cape Town, South Africa, May 2010.
K. I. Pedersen, G. Berardinelli, F. Frederiksen, P. Mogensen, and A. Szufarska, "A flexible 5G frame structure design for frequency-division duplex cases", IEEE Communications Magazine, vol. 54, No. 3, pp. 53-60, Mar. 2016.
X. Yang, "A Multi-level Soft Frequency Reuse Technique for Wireless Communication Systems", IEEE Commun. Letters, vol. 18, No. 11, pp. 1983-1986, Nov. 2014.
R. Tarjan, "Depth-first search and linear graph algorithms", SIAM J. on Comput., vol. 1, No. 2, pp. 146-160, Jun. 1972.
L. Rokach, and O. Maimon. "Clustering methods," Data Mining and Knowledge Discovery Handbook. pp. 321-352. Springer, 2005.
S. Tsukiyama, M. Ide, H. Ariyoshi, and I. Shirakawa, "A new algorithm for generating all the maximal independent sets", SIAM J. on Comput., vol. 6, No. 3, pp. 505-517, Sep. 1977.
M. Rahman, and H. Yanikomeroglu, "Enhancing cell-edge performance: a downlink dynamic interference avoidance scheme with inter-cell coordination," IEEE Transactions on Wireless Communications, vol. 9, No. 4, pp. 1414-1425, Apr. 2010.
D. Parruca, and J. Gross, "Throughput analysis of proportional fair scheduling for sparse and ultra-dense interference-limited OFDMA/LTE networks", IEEE Transactions on Wireless Communications, vol. 15, No. 10, pp. 6857-6870, Oct. 2015.

\* cited by examiner

COMMUNICATION SYSTEM WITH ALLOCATING FREQUENCIES TO INTERFERED USER EQUIPMENTS

This application is a National Stage Entry of PCT/JP2019/027096 filed on Jul. 9, 2019, which claims priority from Great Britain Patent Application 1811565.9 filed on Jul. 13, 2018, the contents of all of which are incorporated herein by reference, in their entirety.

TECHNICAL FIELD

The present invention relates to a radio access network in a cellular or wireless telecommunications network, and particularly but not exclusively to interference coordination in small cell networks. The invention has particular but not exclusive relevance to wireless telecommunications networks implemented according to various standards defined by the 3rd Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into so-called '5G' or 'new radio' (NR) technologies.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V1.0 by the Next Generation Mobile Networks (NGMN) Alliance, which document is available from https://www.ngmn.org/5g-white-paper.html.

Whilst a base station of a 5G/NR communication system is commonly referred to as a New Radio Base Station ('NR-BS') or as a 'gNB' it will be appreciated that they may be referred to using the term, eNB (or 5G/NR eNB) which is more typically associated with LTE base stations.

Small Cell (SC) networks, as a great way to augment macro cell capacity in hotspot area, have been an integral part of LTE networks and will play a more important role in 5G networks with the trend of network densification and Centralized Radio Access Network (C-RAN) architecture. In a typical urban scenario, one Centralized Unit (CU) may manage hundreds of small cells deployed across the city, which can significantly reduce the operation cost and provide better performance via cell coordination. As the density of small cells increases, there is a great chance of overlapping coverage. Without appropriate coordination among small cells, cell edge users may face significant performance loss due to interference from neighbouring small cells.

Various solutions have been proposed by 3GPP for inter-cell interference coordination, as described in for example 3GPP Technical Specification (TS) 36.300 V15.2.0 [1]. In frequency domain solutions, frequency domain radio resources are used coordinately by multiple cells. One popular solution is Fractional Frequency Reuse (FFR), which can be further divided into Hard FFR (HFR) and Soft FFR (SFR). In HFR (which is described in e.g. [2]), items of User Equipment (UEs) located in the center region of a cell are allocated a common part of the bandwidth while the remaining bandwidth is partitioned across multiple cells based on a reuse factor N>1 and each part is allocated to the UEs in the edge region of a cell. In SFR (which is described in e.g. [3]), the whole bandwidth is partitioned across multiple cells based on a reuse factor N>1 and each part is allocated to the cell-edge UEs of a cell while the cell-center UEs of a cell can use the bandwidth parts allocated to the cell-edge UEs in other cells but with reduced transmission power. FFR solutions are originally proposed for regular-shaped macro cells which cover a significantly larger geographical area than the cells used in small cell networks. Although dynamic versions have been proposed to adjust bandwidth partition and/or power according to the load distribution, in e.g. [4] and [5], these proposals lack capabilities to handle the irregular shape and complex interference environment typical of SC networks.

In time domain, enhanced Inter-Cell Interference Coordination (eICIC) is proposed to mitigate the interference between macro cells and small cells in Heterogeneous Networks (HetNets) since Release 10. Almost Blank Subframes (ABSs) are applied at an aggressor cell, in which only reference signals are transmitted. The victim UEs of other cells can transmit in the ABS subframes without suffering from strong interference from the aggressor. Two measurement subsets are configured at each UE to measure ABSs and non-ABS subframes respectively such that Channel Quality Indicator (CQI) feedback can accurately reflect the actual channel condition of a specific subframe. In SC networks, multiple moderate interferers may exist instead of one dominant interferer. ABSs of each aggressor may have different patterns and thus each subframe cannot be simply classified as ABS or non-ABS. Thus, in small cell networks, two measurement subsets are not enough to accurately measure Channel State Information (CSI) of a subframe.

There are proposals to mitigate the co-tier interference between femtocells (for example [6] and [7]). However, these proposals assume one UE per femtocell and handle interference problem at cell-level. In SC networks, multiple UEs may exist per SC. For example, SC A may be a strong aggressor for UE 1 in SC B but not a strong aggressor for UE 2 in the same SC B. Thus, cell-level handling cannot capture the complex interference relationships in SC networks.

SUMMARY OF INVENTION

With the prevalent CRAN architecture, interference mitigation schemes can benefit from centralized and coordinated processing. However, the application of existing dynamic schemes, such as Coordinated Multi Point (CoMP) transmission, may be limited due to the lack of fiber fronthaul.

Accordingly, the present invention seeks to provide methods and associated apparatus that address or at least alleviate the above described issues.

Although for efficiency of understanding for those of skill in the art, the invention will be described in detail in the context of a 3GPP system (4G and 5G networks), the principles of the invention can be applied to other systems in which interference coordination is performed.

The invention provides a method performed by an apparatus for controlling allocation of frequency resources in at least one cell serving a plurality of user equipments (UEs), the method comprising: obtaining respective information representing a quality of communication at each UE; determining, based on the received information representing a quality of communication, whether a corresponding UE is a subject of interference and, when the corresponding UE is a subject of interference, identifying at least one aggressor causing the interference to that UE; grouping, for each cell, the respective UEs served by that cell, wherein UEs having a common aggressor or common set of aggressors are grouped into respective group(s), and any UEs not subject to interference are grouped into another group; and allocating at least one frequency to be used by each UE based on the respective group into which that UE has been grouped.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Figure 1:
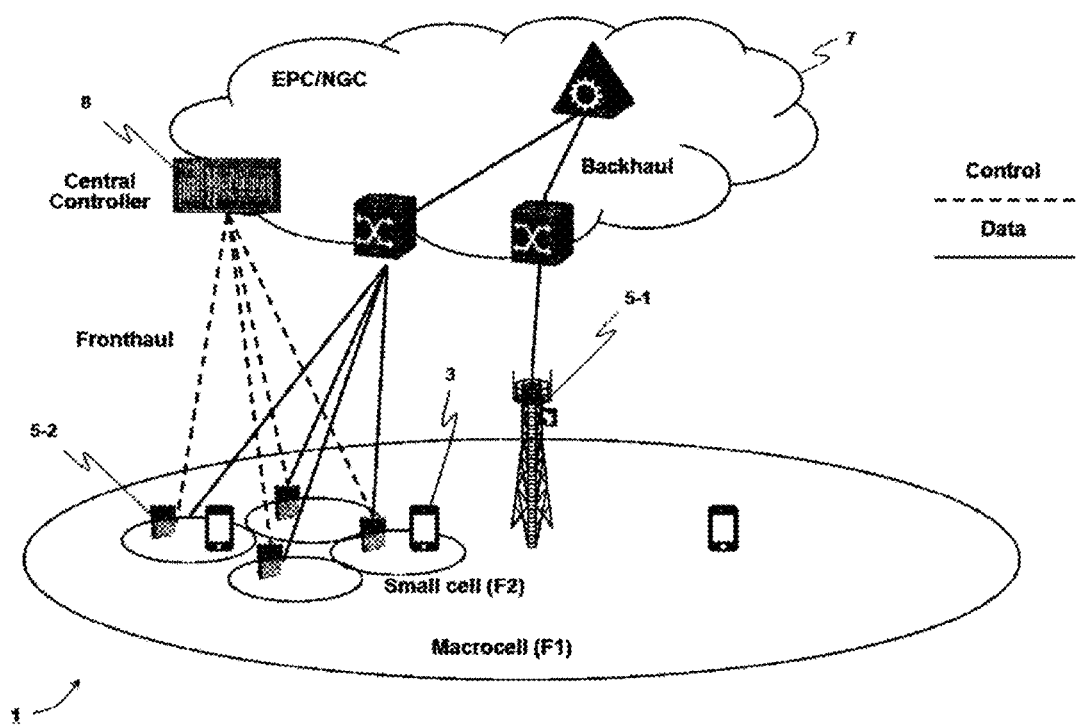
FIG. 1 illustrates schematically a mobile (cellular or wireless) telecommunication system to which example embodiments of the invention may be applied.

FIG. 1 illustrates schematically a typical centralized small cell network 1 to which example embodiments of the invention may be applied. In this network 1, users of mobile devices 3 (UEs) can communicate with each other and other users via respective base stations 5 and a core network 7 using an appropriate 3GPP radio access technology (RAT), for example, an E-UTRA and/or 5G RAT.

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNB'. It will be appreciated that some base stations 5 may be configured to support both 4G and 5G protocols, and/or any other 3GPP or non-3GPP communication protocols. It will be appreciated that a number of base stations 5 form a (radio) access network or (R)AN. In this example, the RAN includes a macro base station 5-1 (or 'macrocell') and a number of home base station 5-2 (or 'small cells'). As those skilled in the art will appreciate, whilst three mobile devices 3, one macro base station 5-1, and four small cells 5-2 are shown in FIG. 1 for illustration purposes, the system, when implemented, will typically include other base stations/small cells and mobile devices (UEs).

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base stations 5 are also connected to the core network nodes via an appropriate interface (such as the so-called 'S1', 'N1', 'N2', 'N3' interface, and/or the like).

The core network 7 (e.g. the Evolved Packet Core (EPC) in case of LTE or the Next Generation Core (NGC) in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include, user plane functions (UPFs) and control plane functions (CPFs). The core network 7 is also coupled to a Data Network (DN), such as the Internet or a similar Internet Protocol (IP) based network (not shown in FIG. 1).

There are N small cells 5-2 deployed in the system, which share the same carrier bandwidth (although there might be other small cells that use a different carrier bandwidth). It is assumed that a different carrier frequency is used by the macro cell 5-1 and/or eICIC is used to mitigate the interference between the macro cell 5-1 and the small cells 5-2. Therefore, the following description focuses on mitigating co-tier interference between small cells 5-2. There are M UEs 3 associated with the small cells 5-2. Each UE 3 is associated with the cell 5-2 with strongest Reference Signal Received Power (RSRP). A central controller 8 manages the small cells 5-2 via respective non-ideal fronthaul connections in order to collect channel state and load information from the small cells 5-2 and to perform resource partition. The central controller 8 may be located, for example, at the edge of the core network 7. The small cells 5-2 are coupled to the core network 7 via respective non-ideal backhaul connections for communicating user-plane data between the small cells 5-2 and appropriate functions (nodes) of the core network 7. Although not shown in FIG. 1, it will be appreciated that each small cell 5-2 may also have an appropriate control connection to functions (nodes) of the core network 7 other than the connection via the central controller 8.

Beneficially, a so-called Fine-Grained Frequency Reuse (FGFR) technique is used in this system for interference coordination among the small cells 5-2 (which may form a CRAN and/or the like). In order to allow frequency reuse, in this system the UEs 3 are divided into groups of UEs 3 where each group can be considered to represent UEs 3 being served by a virtual cell. Beneficially, a much more fine-grained frequency reuse may be applied for the groups of UEs 3 than the traditional approach based on UE location (proximity to cell center which splits UEs between two groups: a cell center group and a cell edge group). Beneficially, the UEs 3 in this system are grouped based on their common aggressor(s) (i.e. transmission source(s) causing interference to the UEs 3).

In more detail, the present invention jointly uses graph theory and optimisation theory which may significantly improve both cell edge UE throughput and mean UE throughput. It can act fast enough to adapt to dynamic environment changes and may be configured to adapt to various operators' requirements.

In this example, the FGFR scheme is used to mitigate downlink interference in an SC network based on CRAN architecture. The scheme includes the following features, amongst others:

Centralized processing: The central controller 8 collects radio channel and load information from the small cells 5-2 and makes coordinated decision on resource allocation (for each associated small cell 5-2). The algorithm can benefit from the powerful computing capability of the central controller 8.

Semi-static update: The resource partition may be semi-statically updated according to the traffic dynamics while existing schedulers (e.g. Medium Access Control (MAC) schedulers) may be used for subframe-level resource allocation. Compared to CoMP, the update may be done on a relatively longer time scale and thus a fiber fronthaul is not necessary.

Frequency domain solution: Distinguished from so-called 'time domain solutions', in the present solution CSI measurement for one subframe is applicable for all the other subframes (e.g. within a predetermined number of consecutive subframes). Thus, even pre-Release-10 UEs can benefit from the proposed scheme. Although in a typical frequency domain solution Physical Downlink Control Channel (PDCCH) interference is not mitigated, this potential problem is not as severe as for Physical Downlink Shared Channel (PDSCH) since a more robust modulation may be used for the PDCCH. In addition, in future 5G networks, in-resource control signaling is likely to be used by embedding control signaling into each data payload. In this case, the interference of both control signaling and data may be handled by the present frequency domain solution.

Fine-grained frequency reuse: According to specific requirements, e.g. UE distribution and MAC scheduler, as many as required UE groups may be constructed (rather than just cell-center and cell-edge groups) to adapt to the irregular shape and complex interference environment typical of small cell networks. Potential frequency reuse opportunities can be fully exploited while aggressor-victim relationships are accurately identified and handled. It will be appreciated that there are multi-level SFR schemes that divide a macro cell into multiple areas (more than two), however, the cell division employed by such schemes is not optimised for small cell networks.

Flexible configuration options: The UE grouping method and optimisation objective of this scheme may be customised according to specific operator policies.

Mobile Device

Figure 2:
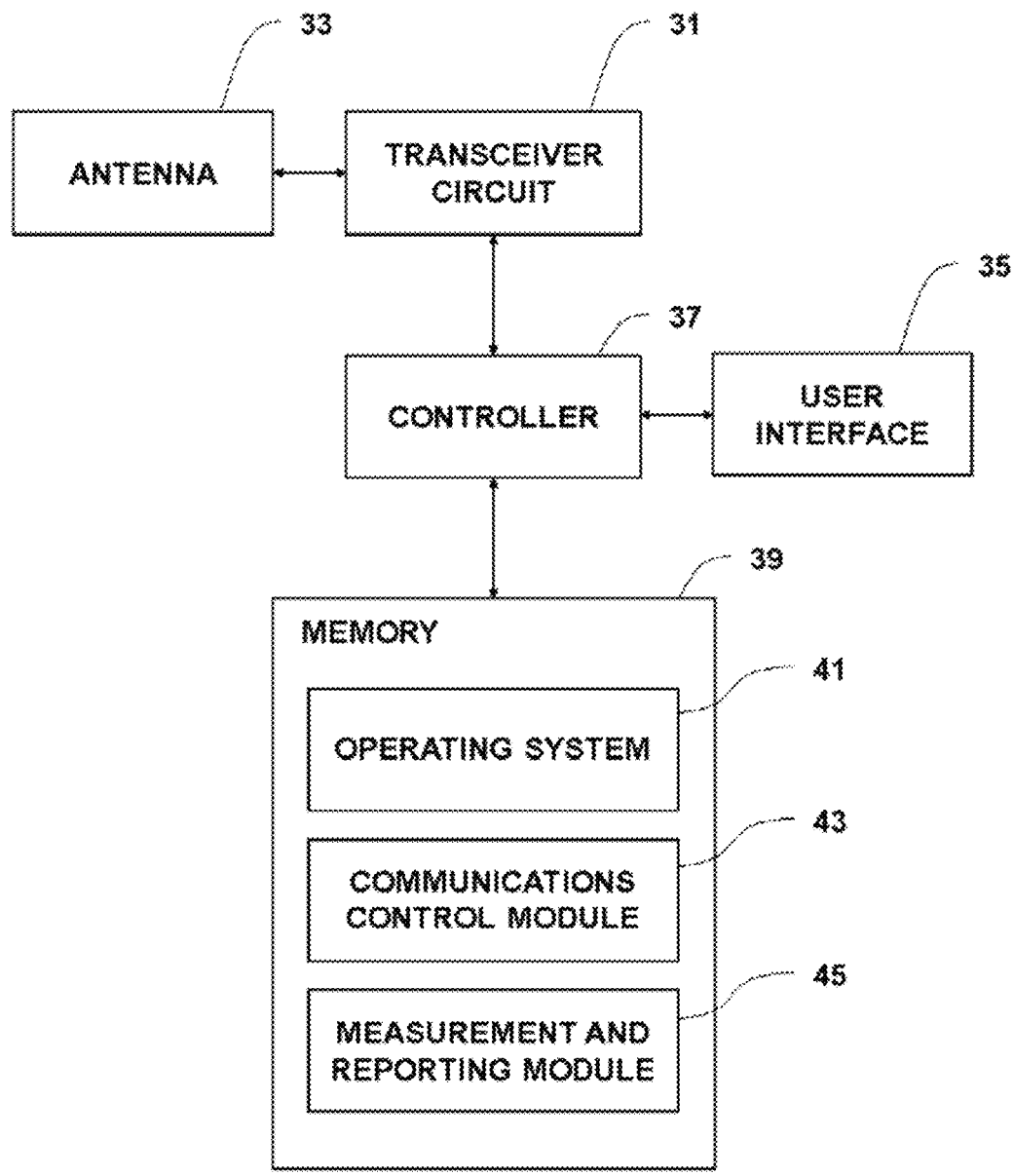
FIG. 2 is a schematic block diagram of a mobile device forming part of the system shown in FIG. 1.

FIG. 2 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 2, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, a communications control module 43, and a measurement and reporting module 45.

The communications control module 43 is responsible for handling (generating/sending/receiving) signalling messages and uplink/downlink data packets between the UE 3 and other nodes, including (R)AN nodes 5 and core network nodes (e.g. the central controller 8). The signalling may comprise signalling related to interference coordination in a small cell network (including signal measurements and reporting).

The measurement and reporting module 45 is responsible for performing signal measurements (e.g. RSRP) and associated reporting to the serving base station 5.

Access Network Node (Base Station)

Figure 3:
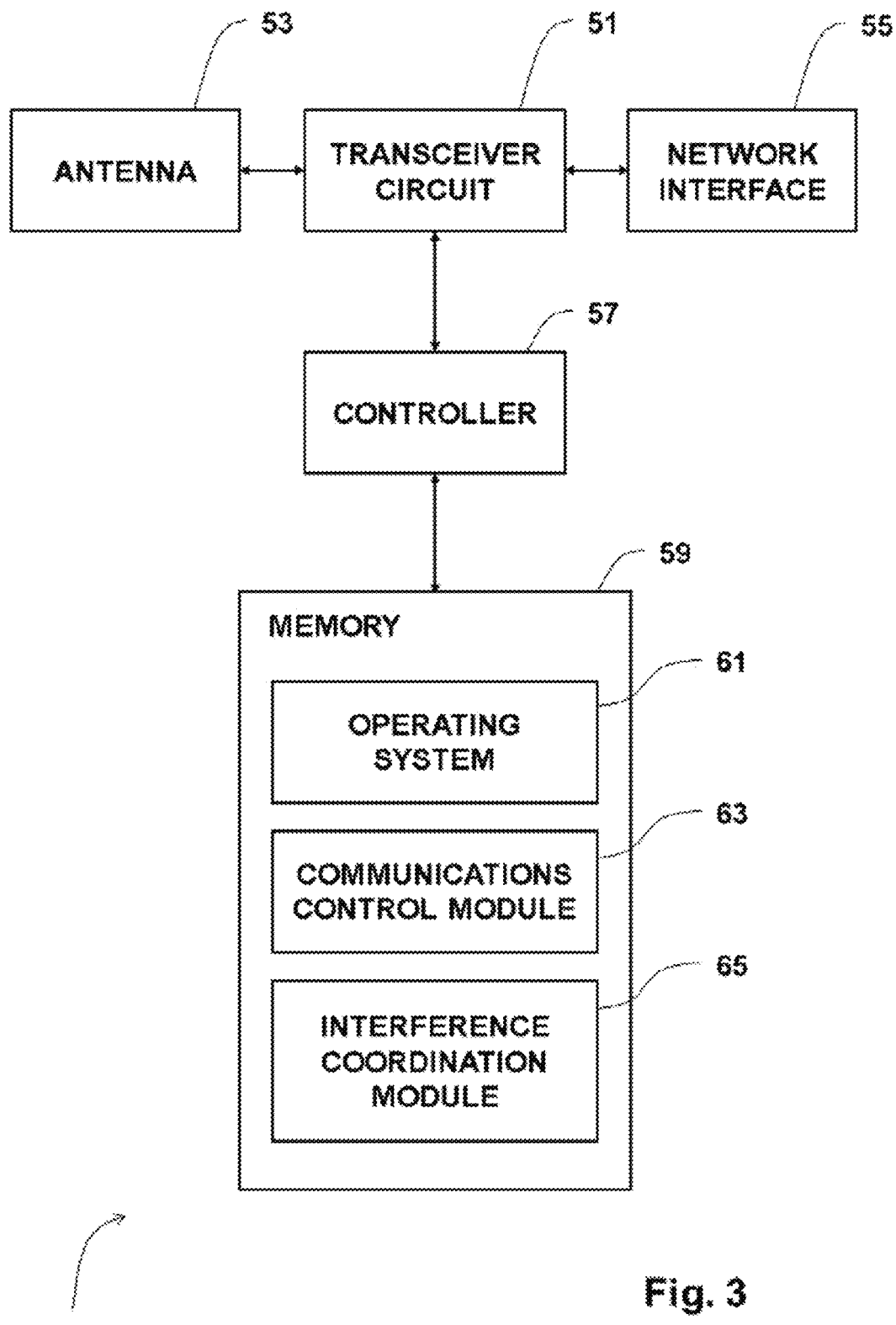
FIG. 3 is a schematic block diagram of an access network node (e.g. a base station) forming part of the system shown in FIG. 1.

FIG. 3 is a block diagram illustrating the main components of the base station 5 (or a similar access network node) shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, a communications control module 63, and an interference coordination module 65.

The communications control module 63 is responsible for handling (generating/sending/receiving) signalling between the base station 5 and other nodes, such as the UE 3 and the core network nodes (e.g. the central controller 8). The signalling may comprise signalling related to interference coordination.

The interference coordination module 65 is responsible for interference coordination among a plurality of small cells 5-2 for UEs 3 served by this base station 5. Details of an exemplary interference coordination method are given with reference to Steps 1 to 8 below.

Central Controller

Figure 4:
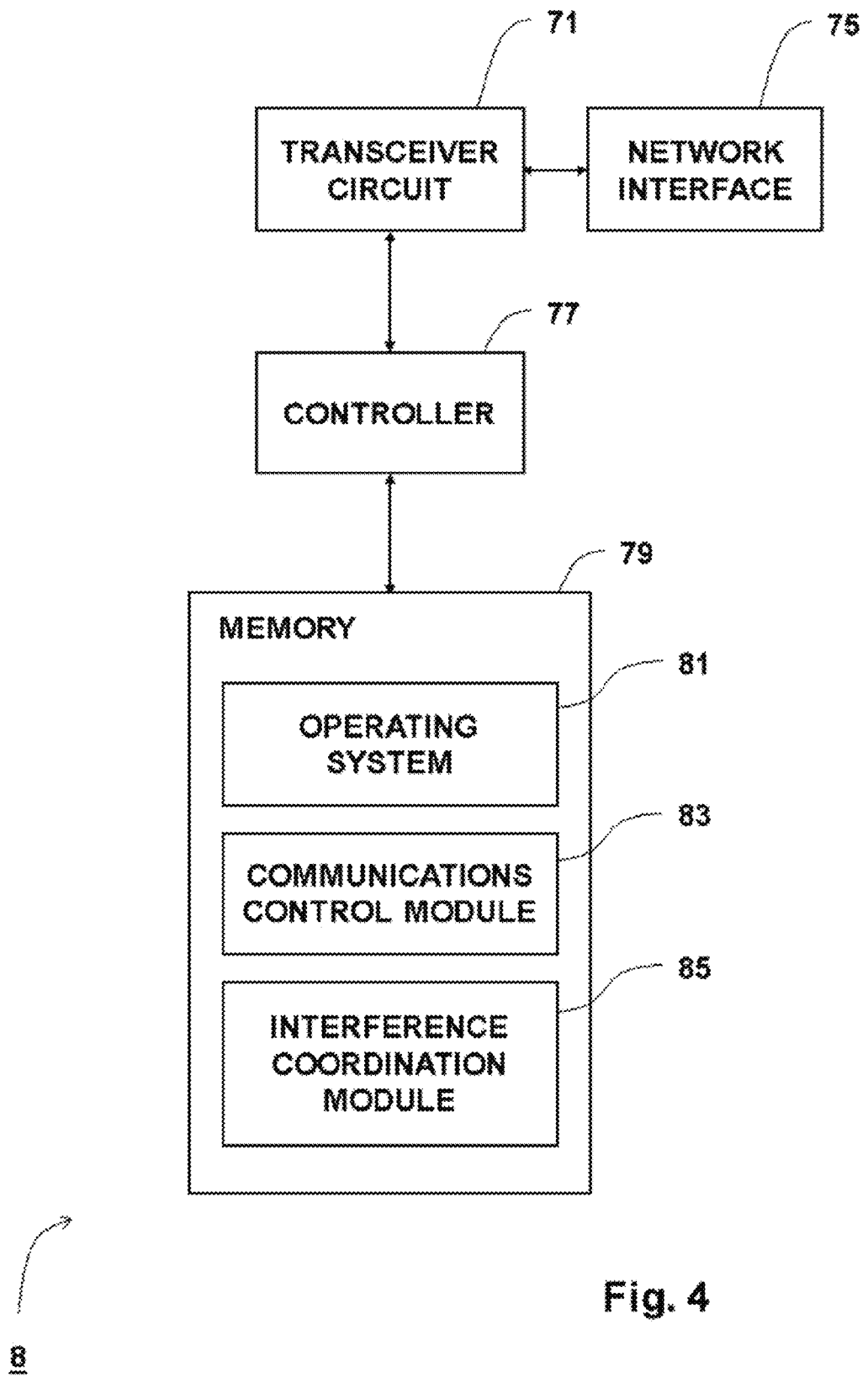
FIG. 4 is a schematic block diagram of a central controller forming part of the system shown in FIG. 1.

FIG. 4 is a block diagram illustrating the main components of a generic core network function, such as the central controller 8 shown in FIG. 1. As shown, the central controller 8 includes a transceiver circuit 71 which is operable to transmit signals to and to receive signals from other nodes (including the UE 3, the base station 5, and other core network nodes) via a network interface 75. A controller 77 controls the operation of the central controller 8 in accordance with software stored in a memory 79. The software may be pre-installed in the memory 79 and/or may be downloaded via the telecommunication network 1 or from a removable data storage device (RMD), for example. The software includes, among other things, an operating system 81, a communications control module 83, and an interference coordination module 85.

The communications control module 83 is responsible for handling (generating/sending/receiving) signaling between the central controller 8 and other nodes, such as the UE 3, the base station 5, and other core network nodes. The signalling may comprise signalling related to interference coordination and resource allocation (in the small cells 5-2 controlled by the central controller 8).

The interference coordination module 85 is responsible for interference coordination among a plurality of small cells 5-2 served by the central controller 8. Details of an exemplary interference coordination method are given with reference to Steps 1 to 8 below.

DETAILED DESCRIPTION

Figure 5:
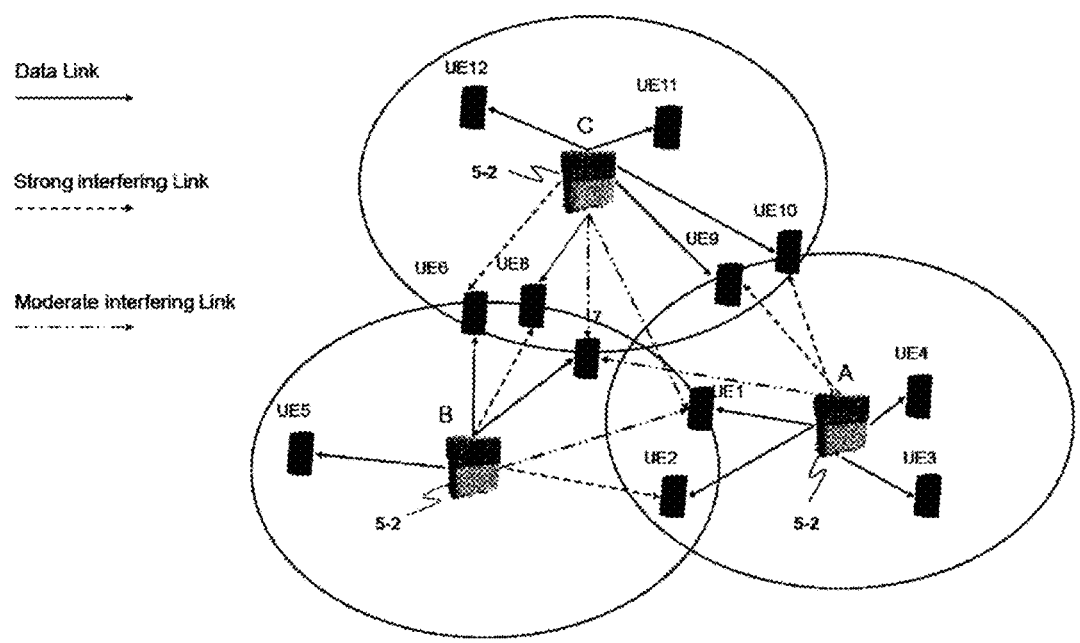
FIG. 5 illustrates schematically some details of an exemplary embodiment of the present invention.
Figure 6:
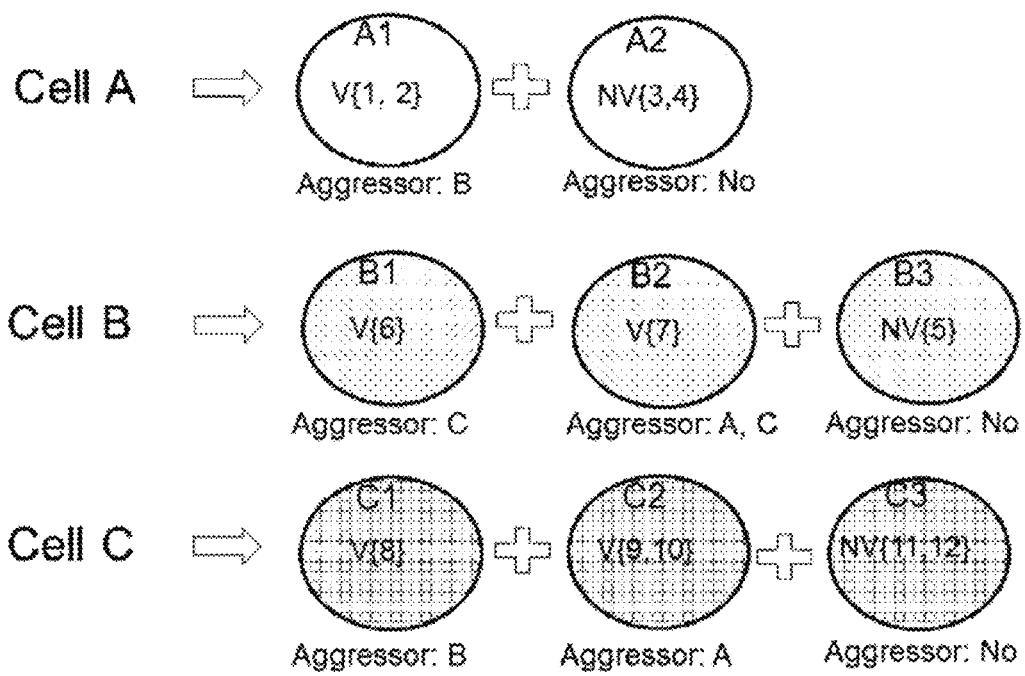
FIG. 6 illustrates schematically some details of an exemplary embodiment of the present invention.
Figure 7:
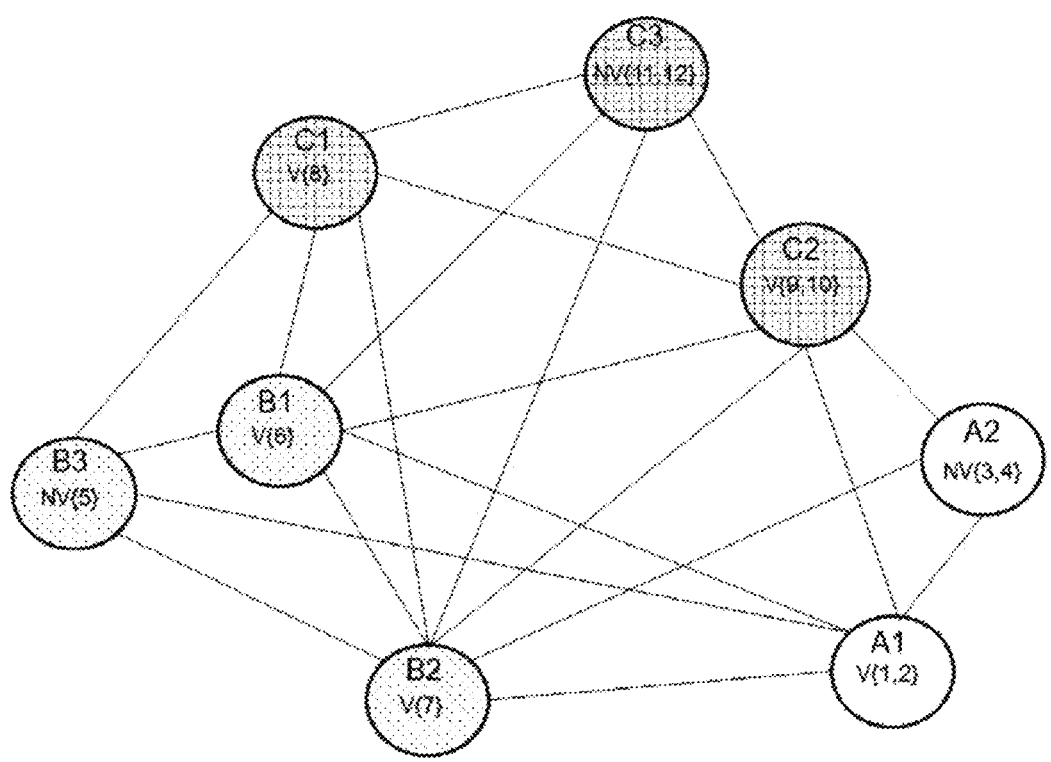
FIG. 7 illustrates schematically some details of an exemplary embodiment of the present invention.

A more detailed description of some exemplary embodiments is provided below with reference to FIGS. 5 to 7. For simplicity of description, the notations used in this document are listed in Table I.

TABLE 1

| | Notations |
|---|---|
| $u_i$ | UE indexed by i (i = 1, . . ., M) |
| $c_k$ | Physical cell indexed by k (k = 1, . . ., N) |
| $RSRP_{u_i,c_k}$ | RSRP received by UE ui from physical cell $c_k$ |
| $G_{u_i,c_k}$ | Channel gain perceived by UE ui from physical cell $c_k$ |
| $P_{c_k}^{CRS}$ | Cell-specific reference signal power at physical cell $c_k$ (per sub-carrier) |
| $w_{u_i}$ | Weight of UE $u_i$ |
| $Th_{nbr}$ | Threshold for neighbouring cell identification |
| $I_{tot}$ | Maximum tolerate interference |
| $Th_{sinr}$ | Expected minimum SINR (dB) that an UE should receive |
| $\sigma^2$ | Thermal noise per subcarrier |
| $I_{cum}$ | Cumulative interference |
| $v_j$ | Virtual cell indexed by j |
| $v(u_i)$ | Corresponding virtual cell that UE $u_i$ is associated |
| $c(v_j)$ | Corresponding physical cell that virtual cell $v_j$ is associated |
| $SINR^{S_n}_{u_i}$ | Signal-interference-plus-Noise Ratio of UE $u_i$ in a MIS $S_n$ |
| $P^{PDSCH}_{c_k}$ | PDSCH power of physical cell $c_k$ per RBG |
| $\beta$ | Multiuser diversity gain of SINR |
| $N_{v(u_i)}$ | Number of UEs in virtual cell $v(u_i)$. |

TABLE 1-continued

| | Notations |
|---|---|
| $\varepsilon$ | Very small constant to enforce the practical limitation of the maximum rate supported by MCS |
| BI | Background interference per RBG received from outside of the considered subgraph |
| $N_{sc}$ | Number of subcarriers per RBG. |
| $S_n$ | MIS (Maximal Independent Set) indexed by n |
| $S^G_U$ | Candidate MIS set |
| $SINR^{MCS}_{min}$ | Minimum SINR required to support the lowest MCS in transmission |
| $x_{S_n}$ | Number of RBGs allocated to MIS $S_n$ |
| t | Sum rate that satisfies relative weighted minimum rate requirement per UE. |
| $N_{BW}$ | Total number of RaGs in system bandwidth |

The steps of an exemplary execution cycle in the central controller 8 are described in this section.

[Math. 1]

Step 1: Get Reports from Cells

Each UE $u_i$ (i=1, . . . , M) measures (using its measurement and reporting module 45) the RSRP of both its serving cell $RSRP_{u_i,s}$ and neighbouring cells $RSRP_{u_i,n}$ and reports the RSRP values and corresponding cell IDs to the serving cell (e.g. one of the small cells 5-2 shown in FIG. 1). The reported RSRP and corresponding cell ID pairs are then forwarded to the central controller 8. In addition, each cell may also optionally report to the central controller 8 the downlink traffic load that is to be transmitted to each UE 3, which may be used to determine the corresponding UE weight (denoted $w_{u_i}$ for UE $u_i$).

[Math. 2]

Step 2: Determine UE Channel Gain and Weight

The channel gain of each UE $u_i$ received from serving physical cell or neighbouring physical cells $c_k$ is calculated as:

$$G_{u_i,c_k} = \frac{RSRP_{u_i,c_k}}{P^{CRS}_{c_k}} \quad (1)$$

where $P_{c_k}^{CRS}$ is a cell-specific reference signal power of physical cell $c_k$ (per sub-carrier). Note that it is assumed that $P_{c_k}^{CRS}$ is preconfigured and/or optimised by other functions such as coverage or mobility optimisation and thus it is a given value.

The weight of each UE $w_{u_i}$ may be determined as a function of various factors such as traffic load and UE grade according to operators' specific requirement,

[Math. 3]

Step 3: Construct Neighbour Graph and Subgraphs

Cell A is tagged as a neighbour of Cell B if there is at least one UE $u_i$ in Cell B satisfying:

$$RSRP_{u_i,B} - RSRP_{u_i,A} < Th_{nbr} \quad (2)$$

An undirected neighbour graph is constructed with each cell as a vertex. An edge is added between two cells if at least one cell is tagged as a neighbour of another cell.

[Math. 4]

Next, all connected components of the constructed neighbour graph are determined. In graph theory, a connected component of an undirected graph G is a subgraph in which any two vertices are connected to each other by paths, and which is connected to no additional vertices in G. By simply doing breadth-first search or depth-first search starting from every unvisited vertex, all connected components can be obtained with linear time complexity $O(|V|+|E|)$, where $|V|$ is the number of vertices and $|E|$ is the number of edges in the graph.

Step 4: Construct Virtual Cells

In dense small cell networks, UEs 3 do not necessarily have a (single) dominant aggressor, but often receive multiple interfering signals of similar strength from multiple neighbour cells. In addition, different UEs 3 in the same small cell 5-2 may not have the same aggressor and some UEs 3 may not have an aggressor at all. FIG. 5 shows an example of the interference relationships between cells 5-2 of a typical small cell network. In this example, UE #1 in Cell A does not have a dominant aggressor but receives moderate interferences from both Cell B and Cell C. UE #2 receives data from Cell A and faces strong interference from Cell B. UE #3 and UE #4 in Cell A have good SINR and can reuse the same resources in Cell B and Cell C.

To capture the interference relationship accurately, the UEs 3 in a small cell 5-2 are grouped based on their individual radio environments. While various methods are possible such as the classic clustering method used in machine learning, a method based on common aggressors of the UEs 3 is used in this example embodiment.

[Math. 5]

For each UE $u_i$ camped at cell S, calculate its maximum tolerate interference:

$$I_{tol} = \frac{RSRP_{u_i,S}}{10^{0.1 \cdot Th_{sinr}}} - \sigma^2 \quad (3)$$

where $Th_{sinr}$ is the expected minimum SINR (dB) that a UE 3 should receive and $\sigma^2$ is thermal noise per subcarrier. If cumulative interference $I_{cum} = \Sigma_{c_k \neq S} RSRP_{u_i,c_k} \leq I_{tol}$, no aggressor is identified. Otherwise, sort neighbour cells in descending order of $RSRP_{u_i,i}$. Starting from neighbour cell $c_k$ with largest $RSRP_{u_i,c_k}$, subtract $RSRP_{u_i,c_k}$ from $I_{cum}$ until $I_{cum} \leq I_{tol}$ and neighbour cell $c_k$ is tagged as aggressor of UE $u_i$.

[Math. 6]

UEs 3 within the same physical cell 5-2 and without any aggressor are grouped into a so-called non-victim virtual cell. UEs 3 within the same physical cell 5-2 with a same set of aggressors are grouped into a so-called victim virtual cell. A UE $u_i$ belongs to one and only one virtual cell represented by $v(u_i)$. A physical cell can be converted into zero or one non-victim virtual cell and zero or more victim virtual cell. The corresponding physical cell 5-1 of a virtual cell $v_j$ is represented by $c(v_j)$. In the following, we use UE group and virtual eel interchangeably. FIG. 6 shows the constructed virtual cells of the example described in FIG. 5. Note that even without a dominant aggressor the interference from Cell B has to be muted (or at least reduced) for UE #1 while the interference from both Cell A and Cell C has to be muted (or reduced) for UE #7 in order to achieve $Th_{sinr}$ for that UE.

Step 5: Construct Conflict Graph and Subgraphs

After all the virtual cells are formed, an undirected conflict graph is constructed. Each vertex corresponds to a virtual cell. Each edge between two virtual cells represents the constraint that the same resources cannot be simultaneously used by the two virtual cells. An edge may be added due to one of the following two reasons: (1) Two virtual cells belong to the same physical cell; (2) Two virtual cells belong to different physical cells but cannot use the same resources due to interference. Thus, an edge is added between a victim virtual cell and every virtual cell (non-victim and victim) in its aggressor(s).

Next, for each connected component extracted from neighbour graph in Step 3, the corresponding conflict subgraph is extracted, containing all the virtual cells in all physical cells in a connected component and all the edges between them in the conflict graph (it will be appreciated, however, that a vertex in a conflict subgraph may not be connected to any other vertex but it may still generate non-negligible interference to other vertices and thus such conflict subgraph are also considered in the exemplary optimisation described in Step 7). FIG. 7 shows the conflict subgraphs for the example in in FIG. 5.

[Math. 7]

Step 6: Find all Maximal Independent Set of a Conflict Subgraph

In graph theory, an independent set is a set of vertices V that any neighbour at a vertex in V is not in V. A Maximal independent Set (MIS) is an independent set that is not a subset of any other independent set.

[Math. 8]

In this example embodiment an algorithm (based on [12]) it used to generate all the maximal independent sets in a conflict subgraph G in $O(|V|||E|||S|)$ time, where $|V|$, $|E|$, and $|S|$ are the number of vertices, edges, and maximal independent sets of G respectively. Note that the problem; of listing al the maximal independent sets of a given graph is equivalent to that of fisting all the maximal cliques of the complementary graph of G.

From the meaning of the conflict subgraph, virtual cells in the same maximal independent set can use the same resources simultaneously.

[Math. 9]

Step 7. Optimisation Problem Formulation and Solution

Optimisation Problem Formulation in this step, an optimisation problem is formulated for resource allocation. While various optimisation objectives may be pursued, this example embodiment aims at maximising sum rate subject to relative weighted minimum UE rate constraints. The per-UE weight $w_{u_i}$ ($\Sigma_{u_i} w_{u_i} \leq 1$) can be configured as a function of various factors such as traffic load, UE grade etc. Therefore, this objective can represent a large set of use cases and can enable UE-centric optimisation. An alternative optimisation objective is to maximise the sum of the logarithm of the UE throughput, which may work better with a Proportional Fair (PF) scheduler. However, the objective is not a linear function any more in this case and thus may cause more computation complexity.

The resource allocation step is for allocating Resource Block Groups (RBGs) in frequency domain to each virtual cell (in this exemplary embodiment one RBG is the minimum unit used by scheduler). Since virtual cells in the same MIS can use the same RBGs simultaneously, it is enough to determine the number of RBGs allocated to the MISes in this step while the actual assignment of which RBG to which virtual cell is performed in Step 8. With this approach, the number of variables to be optimised is independent of the number of RBGs in the system bandwidth (of the small cells 5-2 being processed). Therefore, this approach may be applicable for future 5G networks where the number of RBGs in system bandwidth may be huge due to the very wide bandwidth associated with such networks. Contrastingly, conventional models (such as the one described in [13]) use binary indicators to indicate which specific RBG is allocated to which UE or cell, which may face scalability issue with wide bandwidth.

[Math. 10]

Let $v(u_i)$ denote the virtual cell to which UE is associated and $c(v(u_i))$ denote the physical cell to which the virtual cell $v(u_i)$ is associated. The SINR of UE $u_i$ in a MIS $S_n$ is calculated as follows:

$$SINR_{u_i}^{S_n} = \frac{\beta P_{c(v(u_i))}^{PDSCH} G_{u_i,c(v(u_i))}}{\varepsilon \beta P_{c(v(u_i))}^{PDSCH} G_{u_i,c(v(u_i))} + \sum_{v_j \in S_a | v_j \neq v(u_i)} P_{c(v(u_i))}^{PDSCH} G_{u_i,c(v(u_i))} + BI + N_{sc}\sigma^2}$$ (4)

$P_{c(v(u_i))}^{PDSCH}$ is the PDSCH power of physical cell $c(v(u_i))$ per RBG. $G_{u_i,c}(v_j)$ is the channel gain of UE $u_i$ received from physical cell $c(v_j)$. $\beta$ is multiuser diversity gain of SINR depending on the used scheduler. If round robin scheduler is used, then $\beta=1$. If the PF scheduler is used, $\beta$ can be obtained based on the number of UEs 3 competing for the same resource by assuming that SINR has an exponential distribution [14];

$$\beta = \sum_{i=0}^{N_{v(u_i)}-1} \binom{N_{v(u_i)}-1}{i} \frac{(-1)^i N_{v(u_i)}}{(i+1)^2}$$ (5)

where $N_{v(u_i)}$ is number of UEs in virtual cell $v(u_i)$. Note that field test can be used to obtain more accurate $\beta$. $\varepsilon$ is a very small constant to enforce the practical limitation of the maximum rate supported by Modulation and Coding Scheme (MCS), i.e. above maximum SINR there is no further rate increase as SINR increases. In this simulation, $\varepsilon = 1/1.0^{2.5}$ which bounds the maximum SINR by 25 dB. BI indicates the background interference per RBG received from outside of the considered subgraph and $N_{sc}\sigma^2$ indicates thermal noise per RBG where N is number of subcarriers per RBG.

[Math. 11]

Before running the optimisation algorithm, a preprocessing step is implemented to build the candidate MIS set $s_U^G$. Let $SINR_{min}^{MCS}$ denote the minimum SINR required to support the lowest MCS in physical layer transmission. For each MIS $S_n$ generated in Step 6, it will be added to $s_U^G$ only if each UE $u_i$ in $S_n$ satisfies $SINR_{u_i}^{S_o} \geq SINR_{min}^{MCS}$.

[Math. 12]

Let $x_{S_n}$ ($\forall S_n \in S_U^G$) denote number of RBGs allocated to maximal independent set $S_n$ and t denoting the sum rate that satisfies relative weighted minimum rate requirement per UE. The following optimisation problem is formulated and $x_{S_n}$ and t shall be solved for each conflict subgraph G:

Maximise $t$ (6a)
s.t.

$$t \leq \sum_{u_i} \sum_{S_n \in S_U^G | v(u_i) \in S_n} \frac{x_{S_n}}{N_{v(u_i)}} \log_2(1 + SINR_{u_i}^{S_n})$$ (6b)

$$w_{u_i} t \leq \sum_{S_n \in S_U^G | v(u_i) \in S_n} \frac{x_{S_n}}{N_{v(u_i)}} \log_2(1 + SINR_{u_i}^{S_n}), \forall u_i$$ (6c)

$$\sum_{S_n \in S_U^G} x_{S_n} \leq N_{BW},$$ (6d)

$x_{S_n} \geq 0$, $x_{S_n}$ are intergers, $\forall S_n \in S_U^G$ (6e)

Constraint (6b) ensues that the sum of UE throughput should be at least t. Constraint (6c) ensures that each UE throughput should be at least $w_{u_i} t$. Constraint (6d) ensures that the sum of the allocated RBGs over all the Ines should be no greater than the total number of RBGs in system bandwidth $N_{BW}$. This condition allows enforcing that the endpoints of any edge do not use the same RBGs:

Theorem 1: When the cardinality of $S_U^G$ is larger than 1, the endpoints of any edge do not use the same RBGs only if $\Sigma_{S_n \in S_U^G} x_{S_n} \leq N_{BW}$.

Proof: Theorem 1 is proven using contradiction. Assuming $\Sigma_{S_n \in S_U^G} x_{S_n} > N_{BW}$, there must be at least two MISes in $S_U^G$ (saying $S_i$ and $S_j$) sharing a same RBG given that the cardinality of $S_U^G$ is larger than 1. $S_i$ must have at least one vertex $v_a$ which is not included in $S_j$. By the definition of a maximal independent set; $v_a$ must be adjacent to at least one vertex $v_b$ in $S_j$. Otherwise. $S_j$ is not a MIS since vertex $v_a$ can be added to $S_j$. Since the same RBG is used by both vertex $v_a$ and $v_b$ and $v_a$ is adjacent to $v_b$, it contradicts to the condition that the endpoints of any edge do not use the same RBGs.

[Math. 13]

Optimisation Problem Solution

The problem (6) is an Integer Linear Programming (ILP) problem, which can be exactly solved via the so-called Branch and Bound method. However, since ILP is NP-hard, it may be time-consuming to find the optimal solution. In this example embodiment, therefore, in order to be able to adapt to the dynamic environment change, a fast yet efficient constructive heuristic is proposed, which has three stages:

Stage 1: Initialise $x_{S_n}=0$, $\forall S_n \in S_U^G$. Obtain $x_{S_u}^{LP+}$ by solving LP relaxation of (6) with an additional cutting plane:

$$\sum_{S_n \in S_U^G | v(u_i) \in S_n} x_{S_n}^{LP} \geq 1, \forall v(u_i)$$ (6f)

This cut excludes certain meaningless fractional solutions without affecting the integer solutions to the original problem.

For $\forall v(u_i)$, find the $$MIS\ S_n^* = \arg\max_{S_n \in S_U^G | v(u_i) \in S_n} x_{S_n}^{LP*}.$$

If $x_{S_n^*}=0$, $x_{S_n^*}=1$. In words, in all the MISes containing $v(u_i)$, find the one with the maximal fractional value and allocate one RBG to that MIS if it has no RBG allocated yet. If the same MIS is selected by different virtual cells, only one RBG is allocated. If $\Sigma_{S_n \in S_U^G} x_{S_n} < N_{BW}$, go to Stage 2; otherwise, stop.

Stage 2: For new $x_{S_n}$ from Stage 1, solve the following LP problem (7) to obtain $x_{S_n}^{LP+}$:

$$\text{Maximise } t \quad (7a)$$
$$\text{s.t.}$$

$$t \leq \sum_{u_i} \sum_{S_n \in S_U^G | v(u_i) \in S_n} \frac{x_{S_n} + x_{S_n}^{LP}}{N_{v(u_i)}} \log_2(1 + SINR_{u_i}^{S_n}) \quad (7b)$$

$$w_{u_i} t \leq \sum_{S_n \in S_U^G | v(u_i) \in S_n} \frac{x_{S_n} + x_{S_n}^{LP}}{N_{v(u_i)}} \log_2(1 + SINR_{u_i}^{S_n}), \forall u_i \quad (7c)$$

$$\sum_{S_n \in S_U^G} (x_{S_n} + x_{S_n}^{LP}) \leq N_{BW}, \quad (7d)$$

$$x_{S_n}^{LP} \geq 0, \forall S_n \in S_U^G \quad (7e)$$

$$\sum_{S_n \in S_U^G | v(u_i) \in S_n} (x_{S_n} + x_{S_n}^{LP}) \geq 1, \forall v(u_i) \quad (7f)$$

For all the MIS $S_n$ with $x_{S_n}^{LP+} \geq 1$, update $x_{S_n} = x_{S_n} + \lfloor x_{S_n}^{LP+} \rfloor$. If $\Sigma_{S_n \in S_U^G} x_{S_n} < N_{BW}$, go to Stage 3; otherwise, stop.

Stage 3: For new $x_{S_n}$ from Stage 2, perform as follows:

1. input: $x_{S_n}, \forall S_n \in S_U^G$
2. 
3. while $\Sigma_{S_n \in S_U^G} x_{S_R} < N_{BW}$
4.    obtain $x_{S_n}^{LP+}$ by solving (7)
5.    find the $MIS\ S_n^* = \arg\max_{S_n \in S_U^G} x_{S_n}^{LP*}$
6.    update $X_{S_n} = x_{S_n} + 1$
7. end while Step 8: Resource Assignment Finally, $x_{S_n}$ calculated in the previous step is translated to actual RBG assignment in the system bandwidth for the physical cells (i.e. the small cells 5-2 that are being processed by the central processor 8). While various methods may be pursued, this example embodiment uses the following simple example method for assignment:

1. build a set S* containing all the MISes with non-zero $x_{S_n}$
2. randomly shuffle S*
3. for each $S_n \in S^*$
4.    assign the first available $x_{S_n}$ RBGs to $c(v_j), \forall v_j \in S_n$
5. end for Constraint (6d) guarantees that the assignment is always feasible for any $x_{S_n}$ (obtained in Step 7 above).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the above example embodiments may be applied to both 5G New Radio and LTE systems (E-UTRAN). Specifically, the above described example embodiment may be implemented in LTE small cell products. However, the concept and methodology may also be adapted to 5G scenarios, e.g. ultra-dense small cell networks, coexisting LTE-NR interference coordination, beamforming and/or the like.

In the above description, the UE, the base station, and the central controller are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the base station, and the central controller as a signal over a computer network, or on a recording medium. Further, the functionality performed by part or all of this software may be performed using one or more dedicated hardware circuits. However, the use of software modules is preferred as it facilitates the updating of the UE, the base station, and the central controller in order to update their functionalities.

The above example embodiments are also applicable to 'non-mobile' or generally stationary user equipment.

The above described method may further comprise: determining, for each UE, a respective channel gain and a respective weight based on the received information representing a quality of communication; and allocating at least one frequency to be used by each UE based on the respective channel gain and weight. The information representing a quality of communication may comprise a Reference Signal Received Power (RSRP).

[Math. 14]

The method may comprise determining, for each UE, one or more aggressors based on a maximum tolerable interference associated with that UE. The maximum tolerable interference associated with UE $u_i$ in a cell S may be determined using the formula:

$$I_{tol} = \frac{RSRP_{u_i,S}}{10^{0.1 \cdot Th_{sinr}}} - \sigma^2$$

where $I_{tol}$ represents the maximum tolerable interference, $Th_{sinr}$ represents an expected minimum SINR (dB) that UE $u_i$ is allowed to receive, $\sigma^2$ represents a thermal noise, and $RSRP_{u_i,S}$ is the information representing a quality of communication at UE $u_i$ for cell S.

The method may further comprise: constructing an undirected neighbour graph of the at least one cell with each cell as a vertex, and an edge between any two vertices indicating that interference therebetween is non-negligible; constructing respective neighbour subgraph(s) in which any two vertices are connected to each other by respective paths; constructing an undirected conflict graph in which each vertex corresponds to a group, and an edge between two vertices (groups) of the conflict graph indicating that the same resources cannot be simultaneously used by the corresponding groups; and constructing respective conflict subgraph(s) in which all vertices (groups) belong to the vertices (cells) of respective neighbour subgraph(s).

It will be appreciated that an edge may be added between two groups when one of the following conditions is met: i) the two groups belong to the same cell; and ii) the two groups belong to different cells but they cannot use the same resources due to interference caused by at least one common aggressor.

[Math. 15]

The method may further comprise: determining all Maximal Independent Sets (MIS's) in each conflict subgraph, wherein an MIS is an independent set that is not a subset of any other independent set; and allocating the same frequency simultaneously to a plurality of UEs in any group in the same MIS. In this case, the method may further comprise determining a number $x_{S_n}$ of Resource Block Groups (RBGs) in frequency domain that may be allocated to each MIS $S_n$. For example, the number $x_{S_n}$ of RBGs may be determined based on a sum rate t that satisfies a required relative weighted minimum rate per UE. The number $x_{S_n}$ of RBGs may be determined by maximising the sum rate t based on at least one of the following formulas:

$$t \leq \sum_{u_i} \sum_{S_n \in S_U^G | v(u_i) \in S_n} \frac{x_{S_n}}{N_{v(u_i)}} \log_2(1 + SINR_{u_i}^{S_n})$$

$$w_{u_i} t \leq \sum_{S_n \in S_U^G | v(u_i) \in S_n} \frac{x_{S_n}}{N_{v(u_i)}} \log_2(1 + SINR_{u_i}^{S_n}), \forall u_i$$

$$\sum_{S_n \in S_U^G} x_{S_n} \leq N_{BW},$$

$$x_{S_n} \geq 0, x_{S_n} \text{ are intergers}, \forall S_n \in S_U^G$$

[Math. 16]

The method may further comprise assigning resources in the frequency domain based on the determined number $x_{S_n}$ of RBGs.

[Math. 17]

The method may further comprise optimising allocation of RBGs by: iteratively solving, for each conflict subgraph, a Linear Programming relaxation of the problem of determining the number $x_{S_n}$ of RBGs and a sum rate t; allocating, to a MIS $S_n$, at least one PRB with a maximum value for that MIS $S_n$; and in each iteration, updating the problem with the PRB(s) allocated in the previous iteration(s).

Various other modifications will be apparent to those skilled in the art and will not be described in further detail here.

REFERENCES

[1] 3GPP TS 36.300 V15.2.0, Evolved Universal Terrestrial Radio Access (E-UTRA) and Evolved Universal Terrestrial Radio Access Network (E-UTRAN); Overall description; Stage 2

[2] S. E. Elayoubi, O. Ben Haddada, and B. Fourestie, "Performance evaluation of frequency planning schemes in OFDMA-based networks," IEEE Trans. Wireless Commun., vol. 7, no. 5, pp. 1623-1633, May 2008.

[3] Huawei, 3GPP R1-050507, Soft frequency reuse scheme for UTRAN LTE, May 2005

[4] R. Y. Chang, Z. Tao, J. Zhang, and C.-C. Kuo, "A graph approach to dynamic fractional frequency reuse (FFR) in multi-cell OFDMA networks". IEEE Intl. Conf. on Commum. (ICC), Dresden, Germany, June 2009

[5] M. Qian, W. Hardjawana, Y. Li, B. Vucetic, X. Yang, and J. Shi, "Adaptive soft frequency reuse scheme for wireless cellular networks", IEEE Trans. on Vehicular Tech. vol. 64, no. 1, pp. 118-131, January 2015

[6] M. Y. Arslan, J. Yoon, K. Sundaresan, S. V. Krishnamurthy, and S. Banerjee, "FERMI: a femtocell resource management system for interference mitigation in OFDMA networks", ACM Intl. Conf. on Mobile Comput. and Netw. (Mobicom), Las Vegas, USA, September 2011

[7] H. C. Lee, D. C. Oh, and Y. H. Lee, "Mitigation of inter-femtocell interference with adaptive fractional frequency reuse", IEEE Intl. Conf. on Commum. (ICC), Cape Town, South Africa, May 2010

[8] K. I. Pedersen, G. Berardinelli, F. Frederiksen, P. Mogensen, and A. Szufarska, "A flexible 5G frame structure design for frequency-division duplex cases", IEEE Commun. Mag., vol. 54, no. 3, pp. 53-59, March 2016.

[9] X. Yang, "A Multilevel Soft Frequency Reuse Technique for Wireless Communication Systems", IEEE Commun. Letters, vol. 18, no. 11, pp. 1983-1986, November 2014

[10] R. Tarjan, "Depth-first search and linear graph algorithms", SIAM J. on Comput., vol. 1, no. 2, pp. 146-160, 1972

[11] L. Rokach, and O. Maimon. "Clustering methods," Data Mining and Knowledge Discovery Handbook. pp. 321-352. Springer, 2005

[12] S. Tsukiyama, M. Ide, H. Ariyoshi, and I. Shirakawa, "A new algorithm for generating all the maximal independent sets", SIAM J. on Comput., vol. 6, no. 3, pp. 505-517, 1977

[13] M. Rahman, and H. Yanikomeroglu, "Enhancing celledge performance: a downlink dynamic interference avoidance scheme with inter-cell coordination," IEEE Trans. Wireless Commun., vol. 9, no. 4, pp. 1414-1425, 2010.

[14] D. Parruca, and J. Gross, "Throughput analysis of proportional fair scheduling for sparse and ultra-dense interference-limited OFDMA/LTE networks", IEEE Trans. Wireless Commun., vol. 15, no. 10, pp. 6857-6870, 2016.

This application is based upon and claims the benefit of priority from United Kingdom Patent Application No. 1811565.9, filed on Jul. 13, 2018, the disclosure of which is incorporated herein in its entirety by reference.

What is claimed is:

1. A method performed by an apparatus for controlling allocation of frequency resources in a plurality of cells serving a plurality of user equipments (UEs), the method comprising:
obtaining respective information representing a quality of communication at each UE;
determining whether each UE is subject to interference, based on the respective information;
for each UE that is subject to the interference, identifying at least one aggressor causing the interference to the UE;

grouping, for each cell, the UEs served by the cell that are subject to the interference and that have a common aggressor or a common set of aggressors into a corresponding group, and the UEs that are not subject to the interference into another group;

allocating at least one of the frequency resources to be used by each UE based on the group into which that the UE has been grouped;

constructing an undirected neighbor graph having a plurality of vertices corresponding to the cells and having one or more edges that are each between two of the vertices between which the interference is non-negligible;

constructing a neighbor subgraph of the undirected neighbor graph in which each of one or more pairs of the vertices are connected to each other by respective paths;

constructing an undirected conflict graph having a plurality of vertices corresponding to the groups and having one or more each vertices that are each between two of the vertices that cannot simultaneously use same of the frequency resources; and constructing a conflict subgraph of the undirected conflict group in which all the vertices belong to the vertices of the neighbor subgraph.

2. The method according to claim 1, further comprising:
determining, for each UE, a respective channel gain and a respective weight based on the respective information,
wherein the at least one of the frequency resources to be used by each UE are allocated based on the respective channel gain and the respective weight.

3. The method according to claim 1, wherein the respective information comprises a Reference Signal Received Power (RSRP).

4. The method according to claim 1, wherein the at least one aggressor is identified based on a maximum tolerable interference.

5. The method according to claim 4, wherein the maximum tolerable interference associated with UE $u_i$ in a cell S is determined using the formula:

$$I_{tol} = \frac{RSRP_{u_i,S}}{10^{0.1 \cdot Th_{sinr}}} - \sigma^2$$

where $I_{tol}$ represents the maximum tolerable interference, $Th_{sinr}$ represents an expected minimum SINR (dB) that UE $u_i$ is allowed to receive, $\sigma^2$ represents a thermal noise, and $RSRP_{u_i,S}$ is the information representing a quality of communication at UE $u_i$ for cell S.

6. The method according to claim 1, wherein an edge is added in the undirected conflict group between two groups when either the two groups belong to a same cell, or the two groups belong to different cells but cannot use same of the frequency resources due to the interference caused by at least one aggressor common to the two groups.

7. The method according to claim 1, further comprising:
determining all Maximal Independent Sets (MIS's) in the conflict subgraph, wherein an MIS is an independent set that is not a subset of any other independent set; and
allocating a same of the frequency resources simultaneously to a plurality of UEs in any group in a same MIS.

8. The method according to claim 7, further comprising determining a number $x_{S_n}$ of Resource Block Groups (RBGs) in a frequency domain that are allocatable to each MIS $S_n$.

9. The method according to claim 8, wherein a number $x_{S_n}$ of RBGs is determined based on a sum rate t that satisfies a required relative weighted minimum rate per UE.

10. The method according to claim 8, wherein a number $x_{S_n}$ of RBGs is determined by maximising a sum rate t based on at least one of:

$$t \leq \sum_{u_i} \sum_{S_n \in S_U^G | v(u_i) \in S_n} \frac{x_{S_n}}{N_{v(u_i)}} \log_2(1 + SINR_{u_i}^{S_n})$$

$$w_{u_i} t \leq \sum_{S_n \in S_U^G | v(u_i) \in S_n} \frac{x_{S_n}}{N_{v(u_i)}} \log_2(1 + SINR_{u_i}^{S_n}), \forall u_i$$

$$\sum_{S_n \in S_U^G} x_{S_n} \leq N_{BW},$$

$$x_{S_n} \geq 0, x_{S_n} \text{ are intergers}, \forall S_n \in S_U^G$$

11. The method according to claim 8, further comprising assigning resources in the frequency domain based on the number $x_{S_n}$ of RBGs.

12. The method according to claim 8, further comprising optimising allocation of RBGs by:
iteratively solving, for the conflict subgraph, a Linear Programming relaxation of a problem of determining the number $x_{S_n}$ of RBGs and a sum rate t;
allocating, to each MIS $S_n$, each RBG with a maximum value for the MIS $S_n$; and
in each of a plurality of iterations, updating the problem with the each RBG allocated in every previous iteration.

13. A base station for controlling allocation of frequency resources in a plurality of cells serving a plurality of user equipments (UEs), the base station comprising:
a memory storing instructions; and
at least one processor configured to process the instructions to:
obtain respective information representing a quality of communication at each UE;
determine, whether each UE is subject to interference, based on the respective information;
for each UE that is a subject of the interference, identify at least one aggressor causing the interference to the UE;
group, for each cell, the UEs served by the cell that are subject to the interference and that have a common aggressor or a common set of aggressors into a corresponding group, and the UEs that are not subject to the interference into another group;
allocate at least one of the frequency resources to be used by each UE based on the group into which the UE has been grouped;
Construct an undirected neighbor graph having a plurality of vertices corresponding to the cells and having one or more edges that are each between two of the vertices between which the interference is non-negligible;
construct a neighbor subgraph of the undirected neighbor graph in which each of one or more pairs of the vertices are connected to each other by respective paths;
construct an undirected conflict graph having a plurality of vertices corresponding to the groups and having one or more each vertices that are each between two of the vertices that cannot simultaneously use same of the frequency resources; and
construct a conflict subgraph of the undirected conflict group in which all the vertices belong to the vertices of the neighbor subgraph.

14. The apparatus according to claim 13, wherein the apparatus is configured as a central controller for a small cell network of less than a threshold size.

\* \* \* \* \*